United States Patent
Al-Mahshi (10) Patent No.: US 11,339,842 B2
(45) Date of Patent: May 24, 2022

(54) BRAKE SYSTEM WITH TORQUE DISTRIBUTING ASSEMBLY

(71) Applicant: AKEBONO BRAKE INDUSTRY CO., LTD., Tokyo (JP)

(72) Inventor: Waleed Mahmoud Al-Mahshi, Farmington Hills, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 36 days.

(21) Appl. No.: 16/817,854

(22) Filed: Mar. 13, 2020

(65) Prior Publication Data
US 2020/0309213 A1   Oct. 1, 2020

Related U.S. Application Data

(60) Provisional application No. 62/823,732, filed on Mar. 26, 2019.

(51) Int. Cl.
| | |
|---|---|
| *F16D 65/18* | (2006.01) |
| *F16D 55/224* | (2006.01) |
| *F16D 121/24* | (2012.01) |
| *F16D 125/50* | (2012.01) |

(52) U.S. Cl.
CPC ........... *F16D 65/18* (2013.01); *F16D 55/224* (2013.01); *F16D 2121/24* (2013.01); *F16D 2125/50* (2013.01)

(58) Field of Classification Search
CPC . F16D 2125/50; F16D 2121/24; F16D 55/224
See application file for complete search history.

(56) References Cited

U.S. PATENT DOCUMENTS

| | | | |
|---|---|---|---|
| 1,282,614 A | 10/1918 | Miller |
| 1,361,895 A | 12/1920 | Nogrady |
| 1,399,093 A | 12/1921 | Vincent |
| 1,430,744 A | 10/1922 | Lewis |
| 1,529,804 A | 3/1925 | Norgrady |
| 1,556,101 A | 10/1925 | Goodhart |
| 1,586,861 A | 6/1926 | Taylor |
| 1,777,024 A | 9/1930 | Wildhaber |
| 1,791,198 A | 2/1931 | Focher |
| 1,938,649 A | 12/1933 | Welsh |

(Continued)

FOREIGN PATENT DOCUMENTS

| | | |
|---|---|---|
| CN | 101384836 B | 3/2009 |
| CN | 101568752 B | 10/2009 |

(Continued)

OTHER PUBLICATIONS

Extended European Search Report dated Jul. 29, 2020 for European patent application No. 20163390.6.

*Primary Examiner* — Nicholas J Lane
(74) *Attorney, Agent, or Firm* — The Dobrusin Law Firm, P.C.

(57) ABSTRACT

A brake system that includes a brake caliper, a motor, and a torque distributing assembly configured to distribute torque from the motor to a first brake piston and/or to a second brake piston. The torque distributing assembly includes a gear set that includes gears that are configured to rotate about an axis. One of the first brake piston and the second brake piston is configured to move along the same axis during a brake apply or a brake release.

19 Claims, 3 Drawing Sheets

(56) References Cited

U.S. PATENT DOCUMENTS

| | | |
|---|---|---|
| 2,231,968 A | 2/1941 | Thornton |
| 2,329,058 A | 9/1943 | Knoblock |
| 2,329,059 A | 9/1943 | Knoblock |
| 2,329,075 A | 9/1943 | Myers |
| 2,354,214 A | 7/1944 | Lutz |
| 2,420,294 A | 5/1947 | Beckwith |
| 2,424,942 A | 7/1947 | Mynssen |
| 2,431,272 A | 11/1947 | Mynssen |
| 2,479,638 A | 8/1949 | Randall |
| 2,481,873 A | 9/1949 | Randall |
| 2,501,956 A | 3/1950 | Misener |
| 2,545,601 A | 3/1951 | Brubaker |
| 2,557,937 A | 6/1951 | Buckendal |
| 2,570,191 A | 10/1951 | Beckwith |
| 2,624,216 A | 1/1953 | Nielsen |
| 2,638,794 A | 5/1953 | Knoblock |
| 2,667,087 A | 1/1954 | Myers |
| 2,667,088 A | 1/1954 | Myers |
| 2,720,796 A | 10/1955 | Schou |
| 2,778,246 A | 1/1957 | Thornton |
| 2,830,466 A | 4/1958 | Myers |
| 2,850,922 A | 9/1958 | Welsh |
| 2,855,806 A | 10/1958 | Fallon |
| 2,885,032 A | 5/1959 | Dombeck |
| 2,923,174 A | 2/1960 | Gleasman |
| 2,945,400 A | 7/1960 | Dupras |
| 2,971,404 A | 2/1961 | Thorton |
| 3,008,350 A | 11/1961 | Misener |
| 3,027,781 A | 4/1962 | O'Brien |
| 3,053,114 A | 9/1962 | Singer |
| 3,131,578 A | 5/1964 | Elliott |
| 3,142,203 A | 7/1964 | Bamford |
| 3,145,583 A | 8/1964 | Frentzel |
| 3,186,258 A | 6/1965 | Meldola |
| 3,258,993 A | 7/1966 | Dupras |
| 3,330,169 A | 7/1967 | Carrico |
| 3,335,623 A | 8/1967 | Roach |
| 3,343,429 A | 9/1967 | Frost |
| 3,344,688 A | 10/1967 | Frost |
| 3,357,272 A | 12/1967 | Roberts |
| 3,362,258 A | 1/1968 | Thornton |
| 3,364,791 A | 1/1968 | Truckle |
| 3,396,609 A | 8/1968 | Stockton |
| 3,397,593 A | 8/1968 | Knoblock |
| 3,403,582 A | 10/1968 | Morgen |
| 3,453,905 A | 7/1969 | Schmid |
| 3,474,689 A | 10/1969 | Young |
| 3,528,323 A | 9/1970 | Kamlukin |
| 3,546,968 A | 12/1970 | Altmann |
| 3,572,165 A | 3/1971 | Roper |
| 3,606,803 A | 9/1971 | Ottemann |
| 3,628,399 A | 12/1971 | Seitz |
| 3,651,713 A | 3/1972 | Mueller |
| 3,651,907 A | 3/1972 | Myer, Sr. |
| 3,770,879 A | 11/1973 | Watson |
| 3,791,237 A | 2/1974 | Kitano et al. |
| 3,791,238 A | 2/1974 | Bokovoy |
| RE28,004 E | 5/1974 | Ottemann |
| 3,809,191 A | 5/1974 | Woodward |
| 3,815,442 A | 6/1974 | McAninch |
| 3,818,781 A | 6/1974 | Gosenski, Jr. |
| 3,831,462 A | 8/1974 | Baremor |
| 3,837,236 A | 9/1974 | Kagata |
| 3,845,672 A | 11/1974 | Agoscenski, Jr. |
| 3,864,992 A | 2/1975 | Lovdahl |
| 3,911,792 A | 10/1975 | Heyl et al. |
| 3,915,032 A | 10/1975 | Ottemann |
| 3,916,728 A | 11/1975 | Behar et al. |
| 3,938,408 A | 2/1976 | Baremor |
| 3,958,464 A | 5/1976 | Kronbergs |
| 3,985,045 A | 10/1976 | Shilling et al. |
| 4,037,698 A | 7/1977 | Rix et al. |
| 4,077,279 A | 3/1978 | Goscenski, Jr. |
| 4,104,931 A | 8/1978 | Tomich |
| 4,159,656 A | 7/1979 | Tomich |
| 4,162,637 A | 7/1979 | Altmann |
| 4,169,394 A | 10/1979 | Estrada |
| 4,249,429 A | 2/1981 | Denning |
| 4,265,143 A | 5/1981 | Goscenski, Jr. et al. |
| 4,269,086 A | 5/1981 | Altmann |
| 4,271,722 A | 6/1981 | Campbell |
| 4,389,909 A | 6/1983 | Goscenski, Jr. |
| 4,400,996 A | 8/1983 | Schou |
| 4,424,725 A | 1/1984 | Bawks |
| 4,462,272 A | 7/1984 | Roper |
| 4,491,035 A | 1/1985 | Gleasman et al. |
| 4,491,036 A | 1/1985 | Stritzel |
| 4,524,640 A | 6/1985 | Neumann et al. |
| 4,526,063 A | 7/1985 | Oster |
| 4,535,651 A | 8/1985 | Chambers |
| 4,555,962 A | 12/1985 | Bucarelli |
| 4,557,158 A | 12/1985 | Dissett et al. |
| 4,569,250 A | 2/1986 | Nellums |
| 4,598,609 A | 7/1986 | Nellums et al. |
| 4,621,540 A | 11/1986 | Davison |
| 4,644,818 A | 2/1987 | Choma et al. |
| 4,703,671 A | 11/1987 | Jikihara |
| 4,745,818 A | 5/1988 | Edwards et al. |
| 4,792,010 A | 12/1988 | Kitao et al. |
| 4,804,073 A | 2/1989 | Taig et al. |
| 4,809,824 A | 3/1989 | Bendix |
| 4,815,337 A | 3/1989 | Peloquin |
| 4,815,338 A | 3/1989 | Holan et al. |
| 4,838,118 A | 6/1989 | Binkley |
| 4,977,796 A | 12/1990 | Littke |
| 4,986,394 A | 1/1991 | Taft et al. |
| 5,007,886 A | 4/1991 | Holmquist et al. |
| 5,037,362 A | 8/1991 | Teraoka et al. |
| 5,090,518 A | 2/1992 | Schenk et al. |
| 5,090,949 A | 2/1992 | Thoma et al. |
| 5,098,356 A | 3/1992 | Guidoni et al. |
| 5,103,944 A | 4/1992 | Severinsson |
| 5,107,967 A | 4/1992 | Fujita et al. |
| 5,142,940 A | 9/1992 | Hasegawa |
| 5,148,894 A | 9/1992 | Eddy, Jr. |
| 5,183,446 A | 2/1993 | Hughes |
| 5,226,861 A | 7/1993 | Engle |
| 5,348,123 A | 9/1994 | Takahashi et al. |
| 5,413,015 A | 5/1995 | Zentmyer |
| 3,249,182 A | 6/1996 | Gee |
| 5,524,509 A | 6/1996 | Dissert |
| 5,524,735 A | 6/1996 | Gee |
| 5,533,424 A | 7/1996 | Mimura |
| 5,562,561 A | 10/1996 | Gillard |
| 5,590,572 A | 1/1997 | Valente |
| 5,603,246 A | 2/1997 | Zentmyer |
| 5,637,049 A | 6/1997 | Zentmyer et al. |
| 5,671,640 A | 9/1997 | Valente |
| 5,759,126 A | 6/1998 | Zentmyer et al. |
| 5,759,129 A | 6/1998 | Zentmyer et al. |
| 5,769,189 A | 6/1998 | Heibel et al. |
| 5,785,157 A | 7/1998 | Scott et al. |
| 5,816,971 A | 10/1998 | Zentmyer et al. |
| 5,836,220 A | 11/1998 | Valente |
| 5,857,936 A | 1/1999 | Ishikawa |
| 5,897,453 A | 4/1999 | Mimura |
| 5,901,618 A | 5/1999 | Tyson et al. |
| 5,913,390 A | 6/1999 | Hostetler |
| 5,951,426 A | 9/1999 | Forrest |
| 5,983,754 A | 11/1999 | Tyson et al. |
| 5,989,147 A | 11/1999 | Forrest et al. |
| 6,001,040 A | 12/1999 | Engle |
| 6,019,694 A | 2/2000 | Forrest et al. |
| 6,047,615 A | 4/2000 | Tyson et al. |
| 6,053,073 A | 4/2000 | Tyson et al. |
| 6,053,074 A | 4/2000 | Tyson et al. |
| 6,062,105 A | 5/2000 | Tyson et al. |
| 6,076,644 A | 6/2000 | Forrest et al. |
| 6,092,439 A | 7/2000 | Tyson et al. |
| 6,098,763 A | 8/2000 | Holding |
| 6,105,465 A | 8/2000 | Tyson et al. |
| 6,139,460 A | 10/2000 | Drennen et al. |
| 6,173,820 B1 | 1/2001 | Blosch et al. |
| 6,179,097 B1 | 1/2001 | Schumann |

(56) References Cited

U.S. PATENT DOCUMENTS

| | | |
|---|---|---|
| 6,189,661 B1 | 2/2001 | Schaffer |
| 6,261,202 B1 | 7/2001 | Forrest et al. |
| 6,279,690 B1 | 8/2001 | Schaffer |
| 6,279,691 B1 | 8/2001 | Takahashi |
| 6,315,092 B1 | 11/2001 | Schwarz |
| 6,319,166 B1 | 11/2001 | Kyle et al. |
| 6,367,593 B1 | 4/2002 | Siler et al. |
| 6,390,247 B1 | 5/2002 | Drennen |
| 6,401,879 B1 | 6/2002 | Drennen et al. |
| 6,412,610 B1 | 7/2002 | Drennen et al. |
| 6,433,451 B1 | 8/2002 | Cherciu |
| 6,435,320 B1 | 8/2002 | Drennen et al. |
| 6,446,768 B2 | 9/2002 | Kikuta et al. |
| 6,491,126 B1 | 12/2002 | Robison et al. |
| 6,540,640 B2 | 4/2003 | Hibbler et al. |
| 6,551,209 B2 | 4/2003 | Cheadle et al. |
| 6,554,109 B1* | 4/2003 | Olschewski .......... F16D 65/183 188/72.8 |
| 6,561,321 B1 | 5/2003 | Klode et al. |
| 6,626,270 B2 | 9/2003 | Drennen et al. |
| 6,676,555 B2 | 1/2004 | Duan |
| 6,684,988 B2 | 2/2004 | Kapaan et al. |
| 6,796,412 B2 | 9/2004 | Teraoka |
| 6,889,800 B2 | 5/2005 | Halasy-Wimmer et al. |
| 6,915,883 B2 | 7/2005 | Watanabe et al. |
| 6,935,982 B2 | 8/2005 | Handa et al. |
| 7,018,317 B2 | 3/2006 | Tweet et al. |
| 7,022,041 B2 | 4/2006 | Valente |
| 7,086,984 B1 | 8/2006 | Lagenfeld |
| 7,147,585 B2 | 12/2006 | Valente |
| 7,160,219 B2 | 1/2007 | Oates |
| 7,188,710 B2 | 3/2007 | Reuter et al. |
| 7,192,376 B2 | 3/2007 | Ishii et al. |
| 7,219,772 B2 | 5/2007 | Bieker et al. |
| 7,232,399 B2 | 6/2007 | Valente |
| 7,262,533 B2 | 8/2007 | Fiset |
| 7,328,777 B2 | 2/2008 | Han |
| 7,361,116 B2 | 4/2008 | Kyle et al. |
| 7,484,365 B2 | 2/2009 | Ishii et al. |
| 7,490,703 B2 | 2/2009 | Maehara |
| 7,611,437 B2 | 11/2009 | Valente |
| 7,654,934 B2 | 2/2010 | Alfredson |
| 7,721,853 B2 | 5/2010 | Chittka |
| 7,722,495 B1 | 5/2010 | Stanly |
| 7,779,968 B2 | 8/2010 | Noh |
| 7,806,241 B2 | 10/2010 | Takahashi et al. |
| 7,824,296 B2 | 11/2010 | Lyman |
| 7,837,588 B2 | 11/2010 | Valente |
| 7,942,247 B2 | 5/2011 | Adachi et al. |
| 7,946,946 B2 | 5/2011 | Schmidt |
| 7,951,037 B2 | 5/2011 | Sudorowski et al. |
| 7,988,584 B2 | 8/2011 | Balenda, II et al. |
| 8,117,946 B2 | 2/2012 | Haugeberg |
| 8,146,458 B2 | 4/2012 | Radzevich |
| 8,167,763 B2 | 5/2012 | Curtis |
| 8,181,750 B2 | 5/2012 | Homma et al. |
| 8,205,725 B2 | 6/2012 | Sakashita |
| 8,220,593 B2 | 7/2012 | Baumgartner et al. |
| 8,231,493 B2 | 7/2012 | Radzevich |
| 8,185,287 B2 | 10/2012 | Maron et al. |
| 8,292,050 B2 | 10/2012 | Kim |
| 8,292,080 B2 | 10/2012 | Urquhart et al. |
| 8,485,065 B2 | 7/2013 | Blanchard |
| 8,684,147 B2 | 4/2014 | Winkler et al. |
| 8,794,720 B2 | 8/2014 | Schumann et al. |
| 8,875,851 B2 | 11/2014 | Winkler |
| 8,887,878 B2 | 11/2014 | Flodin et al. |
| 9,145,939 B2 | 9/2015 | Giering |
| 9,145,950 B2 | 9/2015 | Dettenberger et al. |
| 9,180,841 B2 | 11/2015 | Giering |
| 9,180,844 B2 | 11/2015 | Murata et al. |
| 9,188,182 B2 | 11/2015 | Park et al. |
| 9,276,463 B2 | 3/2016 | Fleming |
| 9,297,433 B2 | 3/2016 | Takewaki et al. |
| 9,316,277 B2 | 4/2016 | Winkler et al. |
| 9,333,953 B2 | 5/2016 | Masuda et al. |
| 9,353,811 B2 | 5/2016 | Gutelius et al. |
| 9,476,469 B2 | 10/2016 | Gutelius |
| 9,476,470 B2 | 10/2016 | Park et al. |
| 9,587,692 B2 | 3/2017 | Gutelius |
| 9,644,693 B2 | 5/2017 | Chelaidite et al. |
| 9,752,635 B2 | 9/2017 | Bahmata et al. |
| 9,879,739 B2 | 1/2018 | Gutelius et al. |
| 10,137,878 B2 | 11/2018 | Ritter |
| 10,443,666 B2 | 10/2019 | Chelaidite et al. |
| 2002/0000350 A1 | 1/2002 | Murayama et al. |
| 2003/0042084 A1 | 3/2003 | Kawase et al. |
| 2003/0164272 A1 | 9/2003 | Chun |
| 2003/0205437 A1 | 11/2003 | Drennen et al. |
| 2004/0045776 A1 | 3/2004 | Baumgartner et al. |
| 2004/0159509 A1 | 8/2004 | Chang et al. |
| 2004/0168867 A1 | 9/2004 | Kercher et al. |
| 2004/0178028 A1 | 9/2004 | Farmer et al. |
| 2004/0192485 A1* | 9/2004 | Severinsson .......... F16D 65/568 475/149 |
| 2006/0124406 A1 | 6/2006 | Baumgartner |
| 2006/0278477 A1 | 12/2006 | Balz et al. |
| 2008/0011560 A1 | 1/2008 | Yamagucji et al. |
| 2008/0065647 A1 | 3/2008 | Hinohara |
| 2008/0099287 A1 | 5/2008 | Severinsson |
| 2008/0156593 A1 | 7/2008 | Severinsson et al. |
| 2008/0210498 A1 | 9/2008 | Baumgartner et al. |
| 2009/0294224 A1 | 12/2009 | Sakashita |
| 2010/0096224 A1 | 4/2010 | Kim |
| 2010/0122877 A1 | 5/2010 | Kim |
| 2010/0307289 A1 | 12/2010 | Blanchard |
| 2011/0100768 A1 | 5/2011 | Baumgartner et al. |
| 2012/0031716 A1 | 2/2012 | Flodin et al. |
| 2012/0252625 A1 | 10/2012 | Crasset |
| 2013/0087422 A1 | 4/2013 | Park et al. |
| 2013/0153349 A1 | 6/2013 | Akada et al. |
| 2013/0237363 A1 | 9/2013 | Fusegi et al. |
| 2013/0299288 A1 | 11/2013 | Ryu et al. |
| 2014/0000992 A1 | 1/2014 | Tajima et al. |
| 2014/0034432 A1 | 2/2014 | Bull |
| 2014/0182980 A1 | 7/2014 | Muramatsu et al. |
| 2015/0129371 A1 | 5/2015 | Gutelius et al. |
| 2015/0144438 A1 | 5/2015 | Park et al. |
| 2015/0151052 A1 | 6/2015 | Stroumpoulis et al. |
| 2015/0167761 A1* | 6/2015 | Son ..................... F16D 55/224 188/72.6 |
| 2015/0204402 A1 | 7/2015 | Gutelius |
| 2015/0354650 A1 | 12/2015 | Bull |
| 2015/0354651 A1* | 12/2015 | Park ..................... B60T 13/741 188/72.1 |
| 2015/0362031 A1 | 12/2015 | Kong et al. |
| 2016/0001794 A1 | 1/2016 | Gibney et al. |
| 2016/0017942 A1 | 1/2016 | Kwon et al. |
| 2016/0076607 A1 | 3/2016 | Yasui et al. |
| 2016/0076631 A1 | 3/2016 | Funada |
| 2016/0215840 A1 | 7/2016 | Chelaidite et al. |
| 2016/0238094 A1 | 8/2016 | Gutelius et al. |
| 2016/0290424 A1 | 10/2016 | Gutelius |
| 2017/0058979 A1 | 3/2017 | Bahmata |
| 2017/0106848 A1 | 4/2017 | Ritter |
| 2017/0191539 A1 | 7/2017 | Chelaidite et al. |
| 2018/0135711 A1 | 5/2018 | Chelaidite et al. |
| 2019/0039587 A1 | 2/2019 | Ritter |
| 2019/0219117 A1* | 7/2019 | Choi .................... F16D 65/183 |

FOREIGN PATENT DOCUMENTS

| | | |
|---|---|---|
| EP | 1475264 A2 | 11/2004 |
| EP | 1607297 A1 | 12/2005 |
| EP | 2878849 A2 | 6/2015 |
| EP | 2718583 B1 | 3/2016 |
| JP | 2009052682 A | 3/2009 |
| KR | 1020100043694 A | 4/2010 |
| WO | 2000/037819 A1 | 6/2000 |
| WO | 2013/121395 A1 | 8/2013 |
| WO | 2015/151052 A1 | 10/2015 |

\* cited by examiner

BRAKE SYSTEM WITH TORQUE DISTRIBUTING ASSEMBLY

PRIORITY

This application claims priority to U.S. 62/823,732 filed Mar. 26, 2019 the entire disclosure of which is hereby incorporated by reference herein for all purposes.

FIELD

These teachings relate to a brake system, and more particularly to a torque distributing assembly for distributing torque between two or more brake pistons.

BACKGROUND

Some vehicles utilize multi-piston brake systems to create a clamping force to slow, stop, and/or maintain a vehicle in a stopped or parked position. In many of these brake systems, multiple motors are used to move the brake pistons to create and release the clamping force.

Examples of brake system are disclosed in U.S. Pat. Nos. 9,476,469 and 9,587,692, which are hereby incorporated by references herein for all purposes.

To improve braking performance, while also reducing weight, cost, and packaging space, in some vehicle platforms, it may be desirable to have a brake system that includes a single motor that is configured to move multiple-brake pistons to create the clamping force, and then move the multiple brake pistons with the same single motor to release the clamping force.

While creating and/or releasing the clamping force, it may be desirable to have a brake system and/or assembly that is configured to distribute torque or re-distribute torque between two or more brake pistons based on load or resistance differences acting on the brake pistons, which may occur when the brake pad wears unevenly, due to brake pad taper wear; internal component efficiency and variation in the brake system; and/or system degradation; for example.

DETAILED DESCRIPTION

These teaching provide a brake system. The brake system may be a system or assembly for creating a clamping force. The brake system may be any system or assembly for releasing a clamping force. The brake system may function to, may be configured to, or may be adapted or enabled to create a clamping force to slow, stop, and/or maintain a vehicle in a stopped position.

The brake system may be an opposed brake system (i.e., a fixed caliper brake system) or a floating brake system (i.e., a floating caliper). The brake system may be a disc brake system. The brake system may be a drum brake system. The brake system may be a service brake system. The brake system may be a parking brake system.

The clamping force may be a force that, when coupled with a brake pad or brake shoe coefficient of friction, functions to decelerate, slow, stop, and/or prevent movement or rotation of a brake rotor, brake drum, and/or a vehicle. The clamping force may be created during a standard brake apply (i.e., a brake apply force). The clamping force may be created during a parking brake apply (i.e., a parking brake force).

The brake system may include one or more brake pads, and a brake caliper supporting two or more brake pistons. During a brake apply, the two or more brake pistons may be moved towards and away from the one or more brake pads by pressurizing brake fluid. Additionally, or alternatively, during a brake apply, the two or more brake pistons and one or more brake pads may be moved with electromechanical elements to create clamping force. The electromechanical elements may include rotary to linear mechanisms, spindle, nut, motor, one or more gears, a torque distributing assembly, or a combination thereof.

The brake rotor may cooperate with the components of the brake system to create the clamping force. The brake rotor may include an inboard side and an opposing outboard side. The brake caliper may be arranged so that one or more brake pads are located at the inboard side of the brake rotor (i.e., inboard brake pads), and one or more brake pads are located at the outboard side of the brake rotor (i.e., outboard brake pads), or both.

The brake caliper may have two or more piston bores. Each piston bore may define a hollow region in the brake caliper configured to receive and support a corresponding brake piston. The piston bores can be located entirely on one side of the brake rotor, or on both sides of the brake rotor.

The brake system may have two or more brake pistons. The two or more brake pistons may function to move a brake pad, or a corresponding end of brake pad, towards the brake rotor to create the clamping force. The two or more brake pistons may be located on one side of the brake rotor, or one or more brake pistons may be located on each side of the brake rotor.

During a brake apply, to decelerate slow, stop, or maintain a vehicle in a stopped or parked position, the brake pistons may be moved by pressurizing fluid, such as brake fluid. To release the clamping force or the brake apply, the brake piston can be moved by depressurizing the fluid.

During a brake apply, to decelerate slow, stop, or maintain a vehicle in a stopped or parked position, the brake pistons may be moved with one or more electromechanical mechanisms (e.g., with one or more rotary to linear mechanisms; spindles; nuts; motors, etc.).

The brake piston pocket may function to receive at least a portion of a corresponding rotary to linear stage mechanism. The brake piston pocket may be a cup or recess formed into an end of a brake piston. The brake piston pocket may include a bottom wall at the end or bottom of the brake piston pocket and an opposing open end. A gap may exist between the nut of the rotary to linear stage mechanism and a corresponding bottom wall. During a brake apply, the gap may be taken up by moving the rotary to linear stage mechanism towards the bottom wall. Once the gap is taken up, further movement of the nut or rotary to linear stage mechanism may cause the nut or the rotary to linear stage mechanism to press against the bottom wall and then move the brake piston and thus brake pad against the brake rotor to create the clamping force.

The one or more brake pads may be used to create the clamping force. The clamping force can be created by converting the kinetic energy of the vehicle into thermal energy by frictionally engaging one or more brake pads with one or more sides of the brake rotor. The one or more brake pads may include one or more features (i.e. ears, projections, etc.) that may engage or be engaged by a brake caliper, a support bracket, or both to maintain the location of the brake pads within the braking system and relative to the brake rotor.

By moving the nut away from the bottom pocket wall, the brake piston may move in an oppose, release direction, so that the brake pad can then move away from the brake rotor to release the clamping force.

The motor may be any motor for creating a force or torque. For example, the motor may be a DC motor, a brushless motor, a series-wound motor, a shunt wound motor, a compound wound motor, a separately exited motor, a servomotor, a stepping motor, or a permanent magnet motor. The motor may include one or more electrical leads for connecting the motor to a power source. Supplying power to the motor may cause the output shaft of the motor to rotate about an axis. The output shaft rotation may be adapted for an apply direction (to create a clamping force) and for a release direction (to release a clamping force).

The brake system may comprise one or more rotary to linear mechanisms. The one or more rotary to linear mechanisms may function to convert a torque output from the motor or torque distributing assembly into a linear or axial force to move the one or more brake pistons. The one or more rotary to linear mechanisms may be a high-efficiency device such as a ball screw, a roller screw, or a ball ramp, for example. The one or more rotary to linear mechanisms may be a low-efficiency device. The one or more rotary to linear mechanisms may generally include a spindle and a nut.

The spindle may be rotated by the motor or corresponding driving gear. The spindle may be rotated in an apply direction and a release direction to apply and release the brake system brake, respectively. Rotation of the spindle may cause a nut that is threadably engaged with the spindle to move axially along an axis in an apply or release direction to move the brake pad towards or away from a brake rotor.

The nut may be moved axially along an axis that the spindle is configured to rotate about. For example, the nut and the spindle may be threadably engaged such that when the spindle is rotated by the motor or driving gear, the nut moves axially toward or away from a wall of the piston pocket. After contact between the nut and the piston pocket wall is made, further movement of the nut may result in movement of a brake piston and thus a brake pad, or a corresponding end of a brake pad towards a brake pad. The nut may be restricted or prevented from rotating about the axis along which it is configured to axially move.

The torque distributing assembly may function to transfer or distribute an output torque from a motor or gear train to or amongst two or more brake pistons or rotary to linear mechanisms during a brake apply, a parking brake apply, or both to create a clamping force. The torque distributing assembly may function to transfer or distribute an output torque from a motor or gear train to or amongst two or more brake pistons or rotary to linear mechanism during a brake release, a parking brake release, or both to release a clamping force.

While creating and/or releasing the clamping force, the torque distributing assembly according to these teachings is configured to distribute or re-distribute torque between two or more brake pistons based on load or resistance differences acting on the two or more brake pistons.

The torque distributing assembly may be configured to distribute torque from the motor generally equally to both of the first brake piston and the second brake piston so that both of the brake pistons are moved unison until a resistance on one of the two brake pistons becomes higher than the other brake piston. The torque distributing assembly may then be configured to distribute power from the motor to the brake piston with the lower resistance so that the piston assembly with the higher resistance slows or ceases to move.

For example, when one end of a brake pad contacts a brake rotor, the brake piston associated with that end of the brake pad may experience an increase in load or resistance. Accordingly, the torque distributing assembly according to these teachings is configured to reduce a torque supply to that brake piston and then redistribute the torque supply to the other brake piston so that the other corresponding end of the brake pad is moved towards and into contact with the brake rotor. Accordingly, with these teachings, a single motor can be used to move multiple brake pistons to create a clamping force.

For example, uneven or different loads or forces acting on the brake pistons may be a result of the friction material of the brake pad wearing unevenly, which means one end of the brake pad may contact the brake rotor and build clamping force before the other end contacts the brake rotor. The brake pistons associated with the end of the brake pad that contacts and builds clamping force first will apply a greater reactive load or resistance on that brake piston.

For example, uneven or different loads or forces acting on the brake pistons may be a result of system degradation where one brake piston moves faster than another brake piston, which means one end of the brake pad may contact the brake rotor and build clamping force before the other end contacts the brake rotor. The brake pistons associated with the end of the brake pad that contacts and builds clamping force first will apply a greater reactive load or resistance on that brake piston.

For example, uneven or different loads or forces acting on the brake pistons may be a result of tolerance differences in the rotary to linear mechanisms, tolerance variations in the brake piston and caliper bores in which the brake piston is located. These variations may result in one brake piston moving faster or farther than another brake piston, which means one end of the brake pad may contact the brake rotor and build clamping force before the other end contacts the brake rotor. The brake pistons associated with the end of the brake pad that contacts and builds clamping force first will apply a greater reactive load or resistance on that brake piston.

For example, uneven or different loads or forces acting on the brake pistons may be a result of uneven or warped brake rotor surfaces.

The torque distributing assembly may include one or more drive gears. The one or more drive gears may function to transfer torque from the motor or torque distributing assembly to the corresponding spindle. The drive gear may frictionally engage a corresponding spindle. The drive gear may engage a corresponding spindle via spines and corresponding notches defined on the spindle and drive gear.

Two or more of the drive gears may be aligned along and/or configured to rotate about a common axis. Two or more of the drive gears may be aligned within a common plane. Two drive gears may be located in a common plane and two drive gears may be located in another plane, wherein one drive gear is located in both planes, and both planes are generally perpendicular to one another. Two or more of the drive gears may be connected via a belt, chain, or another gear so that rotation of one gear causes another gear to rotate.

The torque distributing assembly may include a plurality of planet gears and sun gears located between two drive gears.

Figure 1:
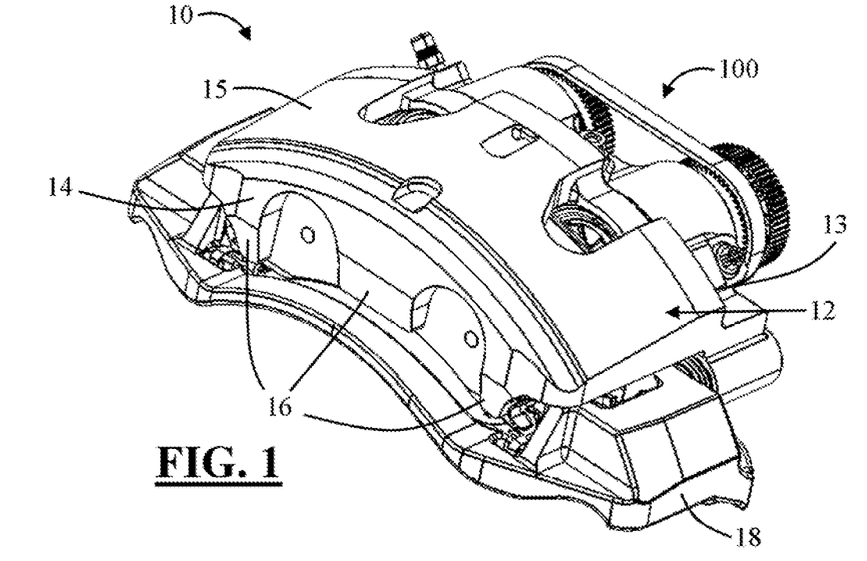
FIG. 1 is a perspective view of a brake system having a torque distributing assembly.

FIG. 1 illustrates a brake system 10. The brake system 10 comprises a brake caliper 12. The brake caliper 12 comprises an inboard side 13, an outboard side 14, and a bridge 15 connecting the inboard and outboard sides 13, 14. Inboard refers to the orientation of the brake caliper 12 relative to a brake rotor or road wheel. The inboard side 13 is on the inboard side of the brake rotor and the outboard side 14 is on the outboard side of the brake rotor. The outboard side 14 or bridge 15 has fingers 16. The brake system 10 comprises a support bracket 18 that is configured to connect the brake system 10 and/or brake caliper 12 to a stationary part of a vehicle, like a knuckle. The brake system 10 comprises a torque distributing assembly 100.

Figure 2:
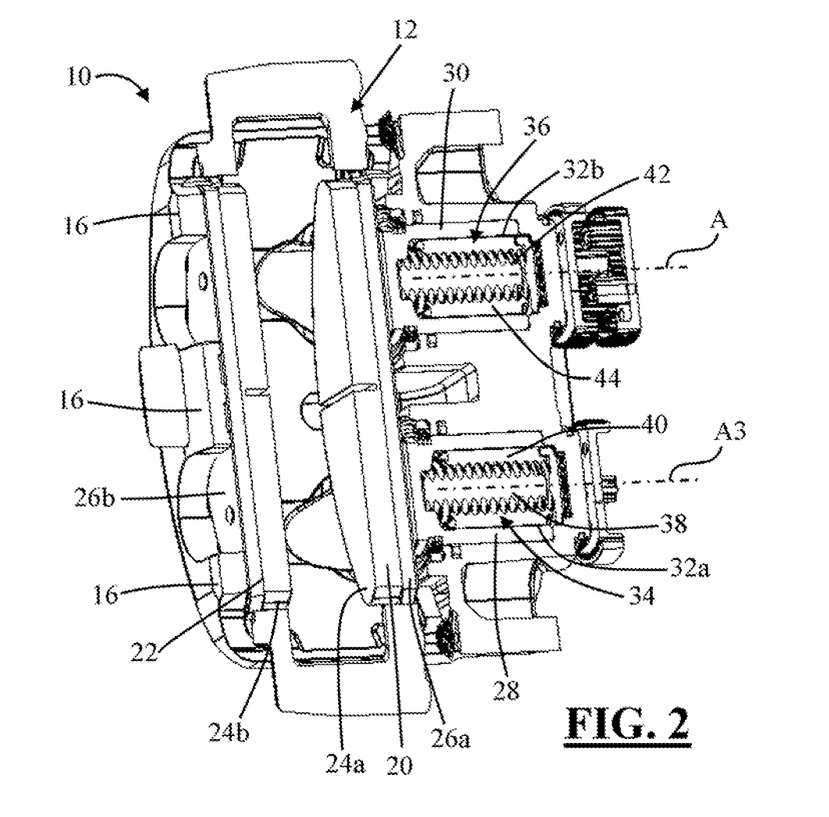
FIG. 2 is a cross sectional view of the brake system and torque distributing assembly.

FIG. 2 illustrates the brake system 10. The brake caliper 12 is configured to support an inboard brake pad 20 and an opposing outboard brake pad 22. Each brake pad 20, 22 comprises a friction material 24a, 24b and a pressure plate 26a, 26b. A brake rotor is configured to be provided between the friction materials 24a, 24h of the brake pads 20, 22. Contact between the friction material 24a, 24b and the brake rotor creates or generates clamping force to slow, stop, or prevent movement of a brake rotor, road wheel, and/or vehicle.

The brake caliper 12 is configured to support one or more brake pistons (e.g. first and second brake pistons 28, 30). The brake pistons 28, 30 are supported or located on the same side of the brake caliper 12 (i.e., on the inboard side 13). The brake pistons 28, 30 are configured to contact or engage the pressure plate 26a of the inboard brake pad 20. The fingers 16 of the bridge 15 (FIG. 1) are configured to contact or engage the pressure plate 26B of the outboard brake pad 22.

Each brake piston 28, 30 comprises a piston pocket 32a, 32b A first rotary to linear mechanism 34 is at least partially received into the piston pocket 32a of the first brake piston 28, and a second rotary to linear mechanism 36 is at least partially received into the piston pocket 32b of the second brake piston 30.

The first rotary to linear mechanism 34 comprises a first spindle 38 and a first nut 40, The first spindle 38 is threadably engaged with the first nut 40 such that rotation of the first spindle 38 about a spindle axis (also referred to herein as longitudinal axis A3) causes the first nut 40 to move. The first nut 40 is restricted or prevented from rotating inside of the piston pocket 32a about axis A3; thus, rotation of the first spindle 40 causes the first nut 38 to move axially within the piston pocket 32a along the axis A3.

The second rotary to linear mechanism 36 comprises a second spindle 42 and a second nut 44. The second spindle 42 is threadably engaged with the second nut 44 such that rotation of the second spindle 42 about a spindle axis (also referred to herein as longitudinal axis A) causes the second nut 44 to move. The second nut 44 is restricted or prevented from rotating inside of the piston pocket 32b about axis A; thus, rotation of the second spindle 42 causes the second nut 44 to move axially within the piston pocket 32b along axis A.

Figure 3:
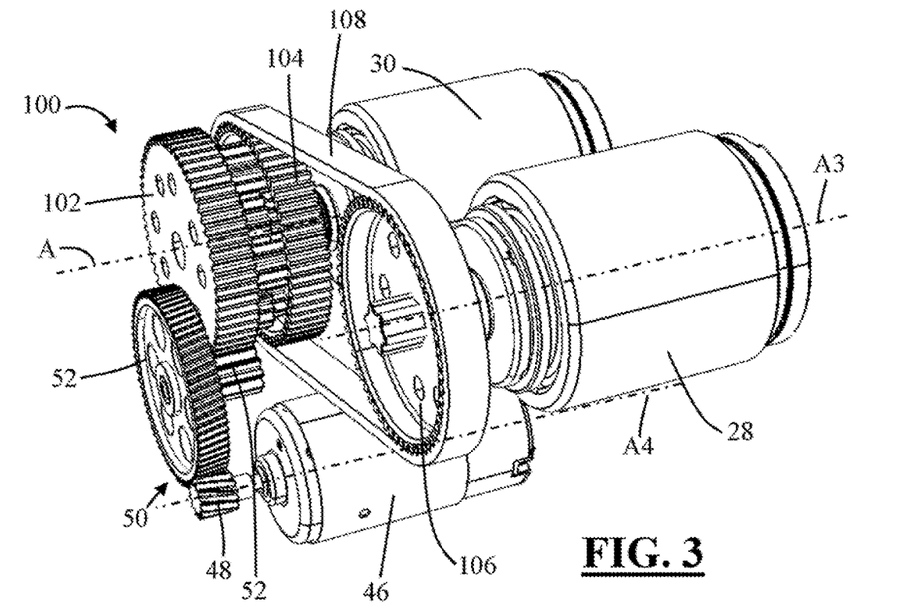
FIG. 3 is a perspective view of the torque distributing assembly, a motor, and the brake pistons.

FIG. 3 illustrates the torque distributing assembly 100, the first and second brake pistons 28, 30, and a motor 46. The motor 46 may be part of the torque distributing assembly 100, the brake system 10, or both. The motor 46 is located in between the first brake piston 28 and the second brake piston 30.

The first brake piston 28 extends along longitudinal axis A; the second brake piston 30 extends along longitudinal axis A3; and the motor 46 and motor output 48 extends along longitudinal axis A4. The longitudinal axis A, A3, and A4 are all generally parallel to one another. The axis A4 is also parallel to the axis A about which the gear set 126 is configured to rotate about.

The torque distributing assembly 100 comprises a first driving gear 102, a second driving gear 104, and a third driving gear 106.

The first and second driving gears 102, 104 are concentrically aligned and configured to rotate about a common axis A (See also FIGS. 2 and 4) in an apply and release direction clockwise and counterclockwise, or vice versa). The common axis A may be the same axis that the second brake piston 30 extends along and also moves along in an apply and release direction. The common axis A may be the same axis A about which the second spindle 42 is configured to rotate about and the same axis A that the second nut 44 moves axially along in an apply and release direction.

The second and third driving gears 104, 106 are arranged adjacent to one another or juxtaposed to one another. The second and third driving gears 104, 106 may be arranged in a common plane. The second and third driving gears 104, 106 are connected together via a connecting member 108, which may be a belt, chain, strap, or other suitable connecting member such as an intermediate gear or member. By way of the connecting member 108, the second and third gears 104, 106 are configured to also rotate together in an apply and release direction. That is, rotation of the second driving gear 104 causes the third driving gear 106 to rotate. The third gear 106 may be configured to rotate about an axis A3 that may be the same axis A3 about which the first spindle 38 is configured to rotate about in an apply and release direction (FIG. 2), the axis that the first nut 40 is configured to axially move along in an apply and release direction, and the axis that the first brake piston 28 moves along in an apply and release direction.

The motor 46 comprises a motor output 48 that is connected to the torque distributing assembly 100 via a gear train 50 comprising at least one gear 52. The gear grain 50 may comprise one or more gears for transferring, transmitting, increasing, or decreasing a torque output generated by the motor 46. The motor output 48 is configured to rotate about axis A3. The axis A3 is generally parallel to the axis A that the gear set 126 (discussed below) is configured to rotate about. Torque from the motor 46 is supplied to the torque distributing assembly 100 via the meshing or interaction of the output 48, the gear train 50, and the first driving gear 102.

Figure 4:
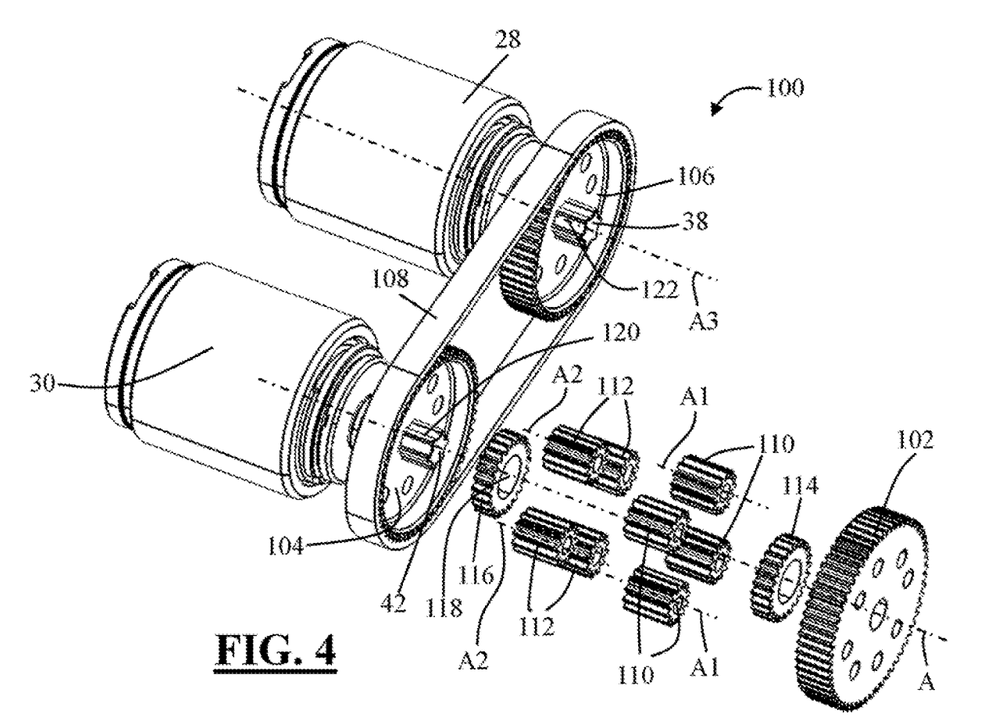
FIG. 4 is an exploded, perspective view of FIG. 3.

FIG. 4 illustrates the torque distributing assembly 100 and the first and second brake pistons 28, 30. The torque distributing assembly 100 comprises a plurality of first planet gears 110, a plurality of second planet gears 112, a first sun gear 114, and a second sun gear 116, all of which are located between the first and second driving gears 102, 104.

The first and second planet gears 110, 112 are supported on pins or shafts that are configured to engage both of the first and second driving gears 102, 104 and surround the first and second sun gears 114, 116. In some configurations, the first sun gear 114 may be combined with or integrated with the first driving gear 102 into a single gear or mechanism.

The second sun gear 116 comprises an engagement section 118 that is configured to engage an engagement section 120 of the spindle 42 so that rotation of the second sun gear 116 about axis A causes the spindle 42 to rotate about axis A.

The third driving gear 106 comprises an engagement section that is configured to engage an engagement section 122 of the spindle 38 so that rotation of third driving gear 106 about axis A3 causes the spindle 38 to rotate about axis A3.

As will be discussed further below, the torque transferring assembly includes a gear set 126 that includes the first driving gear 102, the first sun gear 114, the first and second planet gears 110, 112, the second sun gear 116, and the second driving gear 104. When the torque distributing assembly 100 is active and inactive one or more of the aforementioned gears are configured to rotate about axis A, which is the same axis that the brake piston 30 extends along and is configured to move along during a brake apply or brake release.

Referring to FIGS. 1-4, creating a clamping force will be described. It is understood that one or more of the method steps disclosed herein can be performed in any order; one or more steps may be combined with one or more other steps into a single step; one or more steps may be omitted; one or more steps may be repeated; one or more steps may be substituted by one or more steps; one or more steps may be separated into one or more sub steps; one or more steps or sub steps may be combined with one or more steps or sub steps; or a combination thereof.

The clamping force may be created during application of the service brake to slow or stop a brake rotor, road wheel, and/or vehicle. The clamping force may be created during application of the parking brake to restrict or prevent movement of the brake rotor, road wheel, and/or vehicle. The clamping force may be created during application of both the service brake and the parking brake.

In the following steps, the torque distributing assembly 100 is inactive, which means a force, load, or resistance acting on two or more of the brake pistons is generally the same or equal, and thus the torque distributing assembly 100 is configured to distribute torque generally equal torque to each of the two or more brake pistons at the same time so that the brake pistons 28, 30 are moved at generally the same time.

The method includes a step of turning ON the system 10 and/or the motor 46, Turning ON the system 10 and/or motor 46 means supplying the system 10 and/or the motor 46 with power or current. Turning ON the system 10 and/or motor may occur after a pedal, lever, or other button is moved or depressed and/or when the vehicle is put into park gear or turned OFF, for example.

After the system 10 and/or the motor 46 is turned ON, power is supplied to the motor 46, which turns the motor 46 ON and the motor 46 generates an apply direction torque. The apply direction torque is an output of torque from the motor 46 via output gear 48 (FIG. 3) which is then transferred via the gears 52 in the gear train 50 to the first driving gear 102, which causes the first driving gear 102 to rotate in the apply direction about axis A. Apply direction as used herein may be clockwise or counterclockwise about the respective axis.

Rotation of the first driving gear 102 in the apply direction about axis A causes the first sun gear 114 to rotate in the apply direction about axis A. Rotation of the first driving gear 102 and rotation of the first sun gear 114 in the apply direction about axis A functions to apply a force or torque onto the first planet gears 110, causing the first planet gears 110 to rotate with the first driving gear 104 and the first sun gear 114 in the apply direction about axis A.

Rotation of the first planet gears 110 in the apply direction functions to apply a force or torque onto the second planet gears 112 causing the second planet gears 112 to rotate with the first planet gears 110, the first driving gear 104, and the first sun gear 114 in the apply direction about axis A.

Rotation of the second planet gears 112 in the apply direction about axis A functions to apply a force or torque onto the second sun gear 116 causing the second sun gear 116 to rotate about axis A in the apply direction.

The second sun gear 116 is in communication with the second spindle 42. Therefore, rotation of the second sun gear 116 about axis A in the apply direction causes the second spindle 42 to rotate about axis A in the apply direction.

The second nut 44 located inside of the second brake piston 30 is threadably engaged with the second spindle 42 and restricted or prevented from rotating about axis A. Therefore, rotation of the second spindle 42 in the apply direction about axis A via the second sun gear 116 causes the second nut 44 to move axially along axis A in an apply direction towards a bottom wall of the second piston pocket 32b of the second brake piston 30 until an end of the second nut 44 contacts the bottom pocket wall of the second piston pocket 32b.

Continued rotation of the second spindle 42 in the apply direction and thus continued axial movement of the second nut 44 in the apply direction causes the second brake piston 30 to move in the apply direction until the second brake piston 30 contacts the pressure plate 26a of the inboard brake pad 20. Continued movement of the second brake piston 30 in the apply direction causes the corresponding end of the inboard brake pad 20 to be moved into contact with the brake rotor to generate clamping force.

At the same time, rotation of the second planet gears 112 in the apply direction about axis A also causes the second driving gear 104 to rotate about the axis A in the apply direction. Rotation of the second driving gear 104 about the axis A in the apply direction causes the third driving gear 106 to rotate about its axis A3 in the apply direction by way of the connecting member 108. The third driving gear 106 is in communication with the first spindle 38 so that rotation of the third driving gear 106 in the apply direction causes the first spindle 38 to rotate about axis A3 in the apply direction.

The first nut 40 located inside of the first: brake piston 28 is threadably engaged with the first spindle 38 and restricted or prevented from rotating about axis A3. Therefore, rotation of the first spindle 38 in the apply direction about axis A3 via the third driving gear 106 causes the first nut 40 to move axially along axis A3 in an apply direction towards a bottom wall of the first piston pocket 32a of the first brake piston 28 until an end of the first nut 40 contacts the bottom pocket wall of the first piston pocket 32a.

Continued rotation of the first spindle 38 in the apply direction about axis A3 and thus continued axial movement of the first nut 40 in the apply direction causes the first brake piston 28 to move in the apply direction until the first brake piston 28 contacts the pressure plate 26a of the inboard brake pad 20. Continued movement of the first brake piston 28 in the apply direction causes the corresponding end of the inboard brake pad 20 to be moved into contact with the brake rotor to generate clamping force.

Pressing of the inboard brake pad 20 against the brake rotor causes a reaction force to be generated at the bridge 14, which causes the fingers 16 to pull the outboard brake pad 22 into contact with the opposite side of the brake rotor to generate the clamping force.

In the following steps, the torque distributing assembly 100 is active, which means a force, load, or resistance acting on two or more of the brake pistons is different or not equal. That is, if or when or after a force, load, or resistance acting on one of the brake pistons 28, 30 becomes higher than a force, load, or resistance acting on the other brake pistons 28, 30, the torque distributing assembly 100 is activated.

For example, if the clamping force is achieved with the end of the inboard brake pad 20 associated with the first brake piston 28, or if the first brake piston 28 experiences a higher load or force acting on it than the second brake piston 30, then the first spindle 38 slows or ceases to rotate. When the first spindle 38 slows or ceases to rotate, the third driving gear 106 correspondingly slows or ceases to rotate about axis A3. When the third driving gear 106 slows or ceases to rotate, the second driving gear 104 correspondingly slows or ceases to rotate about axis A due to the connecting member 108 connecting together the second and third driving gears 104, 106.

The slowing or ceasing of rotation of the second driving gear 104 about axis A causes the second planet gears 112 to slow or cease rotating about axis A. However, at the same time, the apply direction torque from the motor 46 continues to be supplied to the assembly 100. Therefore, the apply direction torque transmitted by the first driving gear 102 to the first planet gears 110 and to the second planet gears 112 causes the second planet gears 112 to spin about each of their axis A2 so that torque or force is transmitted to the second sun gear 116 thus causing the second sun gear 116 to continue rotating about axis A in the apply direction.

Continued rotation of the second sun gear 116 in the apply direction continues to rotate the second spindle 42 in the apply direction, which continues to move the second nut 44 in the apply direction, which moves the second brake piston 30 in the apply direction, which then moves the inboard brake pad 20 against the brake rotor to generate clamping force.

Alternatively, if the clamping force is achieved with the end of the inboard brake pad 20 associated with the second brake piston 30, or if the second brake piston 30 experiences a higher load or force acting on it than the first brake piston 28, then the second spindle 42 slows or ceases to rotate. When the second spindle 42 slows or ceases to rotate, the second sun gear 116 correspondingly slows or ceases to rotate.

However, the apply direction torque from the motor 46 continues to be supplied to the assembly 100. Accordingly, the apply direction torque transmitted by the first driving gear 102 and the first planet gears 110 to the second planet gears 112 while the second sun gear 116 is slowed or ceased rotating causes the second planet gears 112 to spin about their axis A2 while the second planet gears 112 continued to rotate about axis A.

Accordingly, the second driving gear 104 can continue to rotate with the second planet gears 112 about axis A, which provides for the third driving gear 106 to rotate about axis A3 by way of the connecting member 108, so that the second spindle 38 is rotated in the apply direction. Rotation of the second spindle 42 in the apply direction continues to move the second nut 44 in the apply direction, which moves the second brake piston 30 in the apply direction, which then moves the inboard brake pad 20 against the brake rotor to generate clamping force.

With continued reference to FIGS. 1-4, releasing of the clamping force will now be described.

The clamping force may be released so that the brake rotor, road wheel, and/or vehicle can one again move.

The method includes a step of turning ON the system 10 and/or the motor 46. This may occur, for example, after a pedal, lever, or other button is moved or depressed and/or when the vehicle is put into drive gear, for example.

After the system 10 and/or the motor 46 is turned ON, power or current is supplied to the motor 46, which turns the motor 46 ON and the motor 46 generates a release direction torque, which is opposite the direction of the apply direction torque. The release direction torque is output from the motor 46 via output gear 48 and then transferred via the gears 52 in the gear train 50 to the first driving gear 102, which causes the first driving gear 102 to rotate in the release direction about axis A.

Rotation of the first driving gear 102 in the release direction about axis A causes the first sun gear 114 to rotate in the release direction about axis A. Rotation of the first sun gear 114 in the release direction about axis A functions to apply a force onto the first planet gears 110, causing the first planet gears 110 to rotate with the first driving gear 104 and the first sun gear 114 in the release direction about axis A.

Rotation of the first planet gears 110 in the release direction functions to apply a force onto the second planet gears 112 causing the second planet gears 112 to rotate with the first planet gears 110, the first driving gear 104, and the first sun gear 114 in the release direction about axis A.

Rotation of the second planet gears 112 in the release direction about axis A functions to apply a force on the second sun gear 116 causing the second sun gear 116 to rotate about axis A in the release direction.

The second sun gear 116 is in communication with the second spindle 42. Therefore, rotation of the second sun gear 116 about axis A in the release direction causes the second spindle 42 to rotate about axis A in the release direction.

Rotation of the second spindle 42 in the release direction about axis A via the second sun gear 116 causes the second nut 44 to move axially along axis A in a release direction away from the bottom wall of the second piston pocket 326 of the second brake piston 30 so that the second brake piston 30 moves away from the inboard brake pad 20 and the inboard brake pad 20 can be pulled out of contact with the brake rotor thus releasing the clamping force.

Rotation of the second planet gears 112 in the release direction about axis A also causes the second driving gear 104 to rotate about the axis A in the ap release ply direction. Rotation of the second driving gear 104 about the axis A in the release direction causes the third driving gear 106 to rotate about its axis A3 in the release direction by way of the connecting member 108. The third driving gear 106 is in communication with the first spindle 38 so that rotation of the third driving gear 106 in the release direction causes the first spindle 38 to rotate about axis A3 in the release direction.

Rotation of the first spindle 38 in the release direction about axis A3 via the third driving gear 106 causes the first nut 40 to move axially along axis A3 in a release direction away from the bottom wall of the first piston pocket 32a of the first brake piston 28 so that the first brake piston 28 moves away from the inboard brake pad 20 and the inboard brake pad 20 can be pulled out of contact with the brake rotor thus releasing the clamping force.

Figure 5:
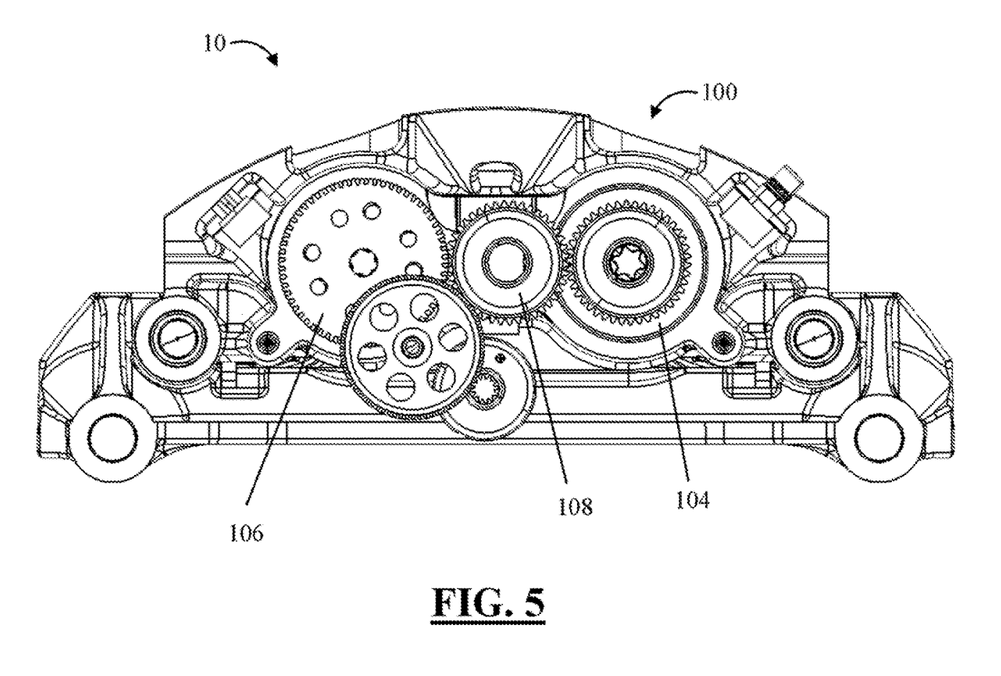
FIG. 5 is a cross-sectional view of a brake system having a torque distributing assembly.

Another brake system 10 and torque distributing assembly 100 is illustrated at FIG. 5. The elements and function of the brake system 10 and torque distributing assembly 100 of FIG. 5 is substantially the same as the brake system 10 and torque distributing assembly 100 in FIGS. 1-4. Therefore, like elements and functions will not be described again, in FIGS. 1-4, the connecting member 108 connecting together the second and third driving gears 104, 106 is a belt or chain. In FIG. 5 the connecting member 108 connecting together the second and third driving gears 104, 106 is a gear that is configured to mesh with the second and third driving gears 104, 106.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A brake system comprising:
    a brake caliper supporting a brake pad, a first brake piston, and a second brake piston;
    a motor; and
    a torque distributing assembly configured to distribute torque from the motor to the first brake piston and/or to the second brake piston;
    wherein the torque distributing assembly comprises a gear set that includes: a first driving gear, a second driving gear, a plurality of planet gears located in between the first driving gear and the second driving gear and in between a first sun gear and a second sun gear, wherein the first sun gear, the second sun gear, the first driving gear, and the second driving gear are all configured to rotate about an axis, the gear set also includes a third driving gear; and
    wherein during a brake apply or a brake release, the first brake piston is configured to be moved along an axis that is the same as the axis that the first sun gear, the second sun gear, the first driving gear, and the second driving gear rotate about to move an end of the brake pad; and the second brake piston is configured to be moved along an axis that is the same as an axis that the third driving gear rotates about to move another end of the brake pad.

2. The brake system according to claim 1, wherein the planet gears rotate about an axis that is generally parallel to the axis about which the first sun gear and/or the second sun gear is configured to rotate about.

3. The brake system according to claim 1, wherein the brake system comprises a spindle at least partially located inside of the second brake piston, the second sun gear comprises an engagement section that is configured to engage an engagement section of the spindle so that rotation of the second sun gear causes the spindle to rotate.

4. The brake system according to claim 1, wherein the second driving gear and the third driving gear are arranged in a common plane,
    wherein rotation of the planet gears about the axis causes both of the second driving gear and the third driving gear to rotate.

5. The brake system according to claim 4, wherein the second driving gear and the third driving gear are connected together with a belt or gear.

6. The brake system according to claim 1, wherein the brake system comprises a first spindle at least partially located inside of the first brake piston and a second spindle at least partially located inside of the second brake piston,
    wherein the third driving gear is in communication with the first spindle and the second driving gear is in communication with the second spindle, the third driving gear and the second driving gear are connected together via a connecting member such that rotation of the second driving gear causes the third driving gear to rotate.

7. The brake system according to claim 6, wherein the connecting member is a belt or gear.

8. A brake system comprising:
    a brake caliper supporting a brake pad, a first brake piston, and a second brake piston;
    a spindle at least partially located inside of the second brake piston;
    a motor; and
    a torque distributing assembly configured to distribute torque from the motor to the first brake piston to move an end of the brake pad and to the second brake piston to move another end of the brake pad;
wherein the torque distributing assembly comprises a first driving gear, a second driving gear, and a sun gear that are configured to rotate about an axis, the sun gear comprises an engagement section that engages an engagement section of the spindle so that rotation of the sun gear causes the spindle to rotate about the axis, and
wherein the second brake piston is configured to be moved along the same axis that the sun gear rotates about during a brake apply or a brake release, and
wherein the torque distributing assembly comprises a third driving gear that is configured to rotate about an axis that is the same as an axis that the first brake piston is configured to be moved along.

9. The brake system according to claim 8, wherein the gear set comprises a plurality of planet gears between the sun gear and a second sun gear, the plurality of planet gears are spur gears that rotate about respective axis that are parallel to the axis that that the sun gear rotates about.

10. The brake system according to claim 9,
wherein rotation of the planet gears about the axis causes both of the second driving gear and the third driving gear to rotate.

11. The brake system according to claim 10, wherein the second driving gear and the third driving gears are connected together with a belt or gear.

12. The brake system according to claim 8, wherein the motor comprises an output that is configured to rotate about an axis that is generally parallel to the axis about which the sun gear rotates about.

13. The brake system according to claim 12, wherein the brake system comprises a gear train comprising one or more gears arranged in between the output of the motor and the gear set.

14. The brake system according to claim 3, wherein the brake system comprises an additional spindle at least partially located inside of the first brake piston, the third driving gear comprises an engagement section that is configured to engage an engagement section of the additional spindle so that rotation of the third driving gear causes the additional spindle to rotate.

15. The brake system according to claim 8, wherein the third driving gear comprises an engagement section that is configured to engage an engagement section of an additional spindle so that rotation of the third driving gear causes the additional spindle to rotate.

16. The brake system according to claim 1, wherein the motor comprises an output that is configured to rotate about an axis that is generally parallel to the axis about which the sun gear rotates about, and the brake system comprises a gear train comprising one or more gears arranged in between the output of the motor and the gear set.

17. The brake system according to claim 1, wherein the third driving gear and the second driving gear are connected together via a connecting member so that the third driving gear and the second driving gear rotate in the same direction.

18. The brake system according to claim 8, wherein each of the planet gears rotate about an axis that is parallel to an axis that the first sun gear and the second sun gear rotate about.

19. The brake system according to claim 8, wherein the planet gears are arranged in a common plane.

* * * * *